United States Patent [19]

Mizutani et al.

[11] 3,919,026
[45] Nov. 11, 1975

[54] FLEXIBLE HOSE MANUFACTURING PROCESS

[75] Inventors: Tadashi Mizutani, Osaka; Soshiro Ono, Fuwa, both of Japan

[73] Assignee: Kuraray Plastics Company, Limited, Osaka, Japan

[22] Filed: Dec. 20, 1973

[21] Appl. No.: 426,603

Related U.S. Application Data

[63] Continuation of Ser. No. 191,760, Oct. 22, 1971, abandoned.

[52] U.S. Cl. ............... 156/143; 138/122; 138/127; 138/133; 156/173; 156/195; 156/244; 156/268; 156/293; 264/209; 264/210 R
[51] Int. Cl. ............................................ B29d 23/12
[58] Field of Search ........... 156/143, 144, 161, 165, 156/171, 173, 184, 187, 195, 217, 218, 244, 257, 268, 293, 162; 138/118, 125, 127, 129, 132, 133; 264/209, 210 R

[56] References Cited
UNITED STATES PATENTS

| | | |
|---|---|---|
| 2,661,025 | 12/1953 | Brace ............................ 156/143 |
| 3,173,822 | 3/1965 | Rigaut ........................... 156/143 |
| 3,192,088 | 6/1965 | Lariviere ........................ 156/143 |
| 3,325,327 | 6/1967 | Swan ............................. 156/143 |
| 3,336,172 | 8/1967 | Hall et al. ...................... 156/143 |
| 3,416,982 | 10/1966 | Petzetakis ...................... 156/193 |
| 3,532,580 | 10/1970 | Kanao ........................... 156/432 |

FOREIGN PATENTS OR APPLICATIONS 814,962  6/1959  United Kingdom ................ 156/143

*Primary Examiner*—Charles E. Van Horn
*Assistant Examiner*—F. Frisenda

[57] ABSTRACT

A method of forming a spirally reinforced flexible hose consists in extruding a strip composed of a soft resilient synthetic plastic material with a reinforcing body of a different synthetic plastic material embedded therein and winding the composite strip helically while in a plastic condition to bond a substantial area of each turn to the preceding turn.

13 Claims, 21 Drawing Figures

INVENTOR

BY

ATTORNEY

FLEXIBLE HOSE MANUFACTURING PROCESS

This application is a continuation of Ser. No. 191,760, which was filed Oct. 22, 1971, now abandoned.

The present invention pertains to flexible hose reinforced by adding a spiral reinforcer made of non-resilient synthetic plastic material having a relatively high physical strength to a tube wall thereof made of relatively soft resilient synthetic plastic material. In detail, the present invention discloses a manufacturing process suitable for making flexible hose superior in quality to conventional ones, a manufacturing process suitable for spirally embedding metal wire in the tube wall of flexible hose and also flexible hose having a spiral metal wire incorporated in the tube wall thereof.

Flexible hose made of synthetic plastic material of this general kind is disclosed in U.S. Pat. No. 3,299,908 and is well known. The manufacturing device used for manufacturing this flexible hose is also disclosed in U.S. Pat. No. 3,290,727. In U.S. Pat. No. 3,290,727 apparatus is disclosed wherein a first conduit discharging first synthetic resin material is encircled with a second conduit discharging second synthetic resin material, the combination of these conduits being rotated in a direction within a third conduit to make flexible hose. That is, in this device a rod-like body having a core of the first synthetic resin and a sheath of the second synthetic resin is initially extruded plastic condition, and these are built up spirally within the third conduit to form a hose.

A flexible hose manufacturing apparatus and process having a more general application than the apparatus and process of U.S. Pat. No. 3,290,727 is disclosed in Japanese publications Nos. 13932/61 and 14139/61 and in U.S. Pat. No. 3,532,580, granted Oct. 6, 1970, entitled Method and Apparatus for Continuously Manufacturing Synthetic Resin Pipe.

The apparatus disclosed in these Japanese publications and said U.S. Pat. No. 3,532,580, comprises a series of cylindrical rolls mounted in a generally circular array to serve as a support for the inside of the hose being formed. These rolls, as well as a single outer roll are commonly driven to revolve at substantially the same peripheral speed.

A series of extruders is also provided to feed separate continuous strips of composite plastic material, while in a plastic condition to the space between one of the inner rolls and the outer roll and the individual axes of the rolls are slightly inclined with respect to the axis of the hose being formed so that the strips are fed in the form of continuous helices with each succeeding turn of strip material being pressed between the inner and outer rolls against the previous turn, resulting in the fusion welding of succeeding turns to each other while in a plastic condition.

However, in the process described in the above mentioned Japanese publications and said U.S. Pat. No. 3,532,580, a comparatively thick strip of material is alternated with a relatively thin strip and the result is that there is only a very thin line of bonding, or fusion welding, between adjacent turns of plastic material. Furthermore, unless the surface of the outer roll conforms exactly to the cross-sectional configurations of the strips of material being fusion welded together it is impossible to form the completed hose. For this reason, the possibility always exists that there will be breaks, or air spaces in the bond between the turns which makes the fusion welding imperfect.

The present invention is an improvement over the methods and apparatus disclosed in the foregoing patents and publications which is characterized by the fact that a composite strip which is helically wound and fusion welded to preceding turns has an initial configuration in cross-section which is generally flat-sided and a thickened apex portion disposed medially of the ends of the flat side. Furthermore, in contradistinction to the previous methods, the composite strip as initially formed need not have the same shape as that which it assumes when finally formed into the completed hose.

Also, a portion of the flat side of the generally triangular body is used to form the interior surface of the completed hose while the remainder of the flat side overlaps a portion of the preceding turn and is fusion welded thereto over a relatively large area.

Another advantage of the present invention resides in the fact that the outside roll, shown in the apparatus of the Japanese publications, mentioned above, is not required because there is a substantial overlapping of the respective turns which ensures that there will be a satisfactory bonding between the plastic material of the respective turns.

Because of the fact that only a marginal area of each turn of material was bonded to the adjacent turns in the previously mentioned Japanese publications it was necessary to employ an outer roll having a surface which corresponded exactly to the outline of the composite strip employed and this necessitated the provision of a special roll for each design of hose to be formed with a consequent change of rolls on the machine when changing from one design to another. In the present invention, variations in the configuration of the composite strip employed and the consequent variations in the contour of the hose formed therefrom are determined by the initial cross-section of the extruded composite strip and, again because of the extensive overlap of the turns, there is no necessity for changing the outer roll when changing the design of hose being produced.

In one form of the present invention, a composite strip is formed by simultaneously extruding a continuous reinforcing rib comprised of a relatively unyielding synthetic plastic material while extruding around it a body of relatively soft, resilient, synthetic plastic material having an initially triangular cross section.

In a second form of the invention the body of soft, resilient material is formed with the base of the triangular portion projecting to a pronounced degree to one side in a thin-walled section which is used to overlap the preceding turn. In a variation of this form, the reinforcing rib may not be completely embedded in the soft resilient plastic body when initially extruded, but will be covered by the aforementioned thin-walled projecting base portion of a succeeding turn.

The third flexible hose manufacturing process according to this invention, relates to a manufacturing process for making composite strip containing metal wire. In the second flexible hose manufacturing process, that is a process wherein, when or after extruding composite strip having a flat and nearly triangular sectional shape projected so that a corner thereof makes the thin wall portion, during a turn of the composite strip in the discharging port of the extruder or between the discharging port of the extruder and the roll of the tube forming machine, or on the roll of the tube forming machine one or more slotted grooves extending from the apex of the triangle to the interior of the reinforcer are formed and after loading metal wire into the slotted groove, the upper side thereof is covered with a portion of the thin wall of the following composite strip and thereby the hose is formed.

Each flexible hose manufacturing process according to the present invention will be explained respectively in detail with reference to the drawings, in which.

Figure 1:
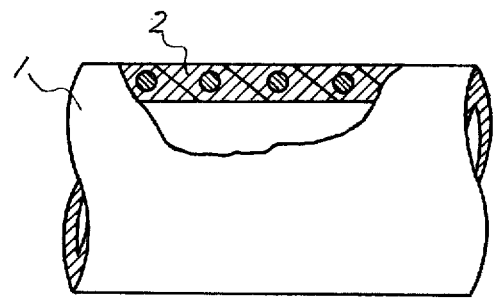
FIG. 1 illustrates a preferred form of flexible hose made in accordance with the method of the present invention, a portion of the hose being shown in section.
Figure 2:
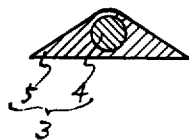
FIG. 2 is a cross-section of the composite strip forming the hose of FIG. 1 as it is initially extruded.
Figure 3:
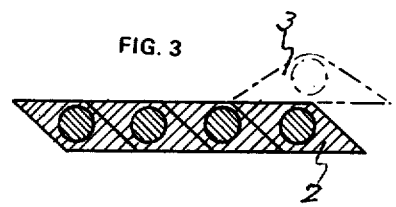
FIG. 3 shows the form taken by the composite strips when they are overlapped and fusion welded together.

FIGS. 1–3 are an example of a flexible hose, both the inner and outer surfaces of which are flat. The flexible hose 1 is constructed by winding spirally the composite strip 2, the final sectional shape of which is nearly diamond-shaped. In the flexible hose manufacturing process according to the present invention, this flexible hose 1 is formed by helically winding the composite strip 3 the base of which is nearly an equilateral triangle in section as shown in FIG. 2 while in a plastic condition. The composite strip 3 comprises the reinforcer 4 made of the first synthetic resin material having relatively high physical strength and the body wall 5 made of the second synthetic resin material which is relatively soft and resilient. Both of these materials are extruded simultaneously while in a plastic condition so that the reinforcing material becomes embedded in, or coated with, the softer resilient body material. FIG. 3 shows that, as the materials are initially extruded the composite strip 3 may have a triangular shape which, when overlapped on the preceding turn of composite strip during winding, may change to the parallelogram shape indicated by numeral 2 as a result of plastic deformation.

Figure 4:
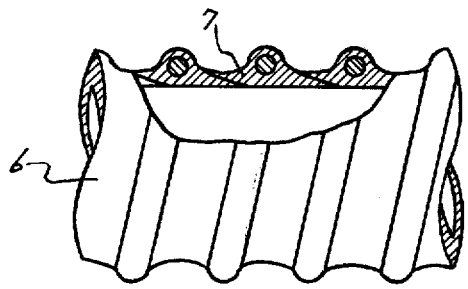
FIGS. 4–6 are similar to FIGS. 1–3, but illustrate a hose made with differently contoured composite strip.
Figure 5:
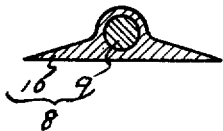
Figure 6:
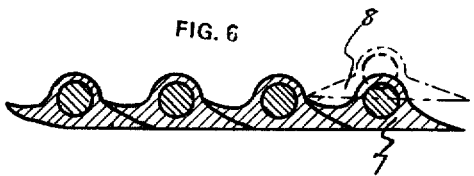

FIGS. 4–6 are an example of flexible hose, the inner surface of which is flat, and having a projected portion in the outer surface thereof the spirally continued apex of which is nearly of circular arc. The flexible hose 6 shown in FIG. 4 is constructed with the element 7 wound spirally the resulting section of which is nearly a parallelogram having a projected portion nearly of circular arc at the apex thereof. This flexible hose 6 is formed with the composite strip 8 having a projected portion of nearly circular arc at the apex thereof and a section of a nearly equilateral triangle at the lower portion thereof, and the composite strip 8 is composed of the reinforcer 9 and the body portion 10.

Figure 7:
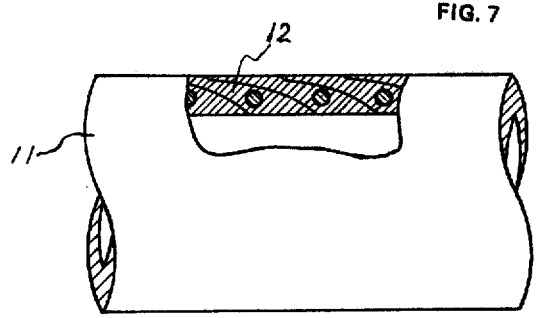
FIGS. 7–9 are similar to FIGS. 1–3, but illustrate still another form of composite strip.
Figure 8:
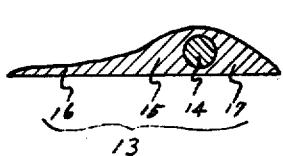
Figure 9:
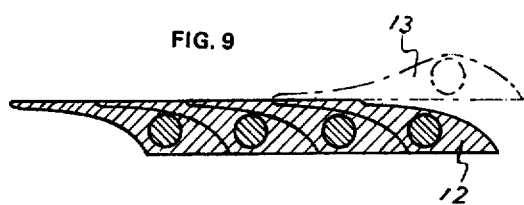

FIGS. 7–9 are a second example of a flexible hose both the inner and outer surface of which are flat. The flexible hose 11 shown in FIG. 7 is constructed with the element 12 coiled spirally. The element 12 of the flexible hose 11 is formed from the composite strip 13 having the shape shown in FIG. 8. The composite strip 13 comprises the extruded reinforcer 14 made of the first synthetic resin material having relatively high physical strength and the body 15 is extruded of the second synthetic resin material relatively soft coated around the reinforcer 14, and has a nearly triangular section somewhat flat, with a corner of the triangular section forming the thin wall portion 16 slightly projected. Numeral 17 shows the longest side of this triangle, that is, the base thereof. FIG. 9 shows that the right side portion of the base 17 of the composite strip 13 forms the inner surface of the flexible hose, the left side portion containing the thin wall portion and longer than the residual portion forming the inner surface is wound on the preceding composite strip 13 while overlapping it thereon, and the composite strip 13 is transformed into the shape of element 12 by covering the upper portion of the reinforcer 14 of the preceding composite strip 13 with a portion of the thin wall 16.

Figure 10:
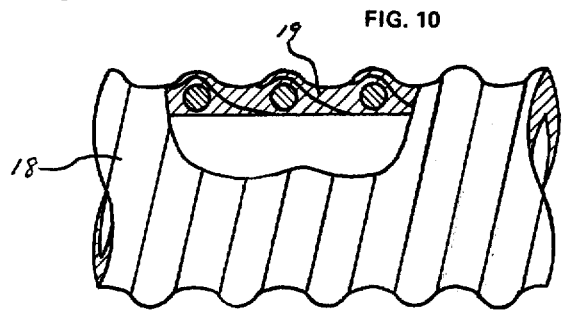
FIGS. 10–12 illustrate a further variation of composite strip.
Figure 11:
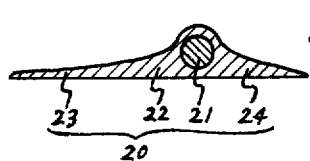
Figure 12:
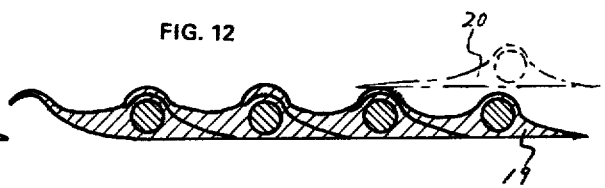

FIGS. 10–12 are a second example of flexible hose the inner surface of which is flat, and having a projected portion the spirally continued apex of which is nearly of circular arc, on the outer surface thereof. The flexible hose 18 shown in FIG. 10 is constructed with the element 19 coiled spirally. The flexible hose 18 comprises the reinforcer 21 and the body 22 as shown in FIG. 11, and is formed with the composite strip 20 having the base 24, the thin wall 23 and a projected portion nearly of circular arc, and as shown in FIG. 12, the right side portion of the base 24 of this composite strip 20 forms the inner surface of the flexible hose and the residual left side portion thereof, longer than the portion forming the inner surface, is wound on the preceding composite strip 20 while overlapping it thereon, which causes the composite strip 20 to be transformed into the shape of element 19 by covering the upper portion of the reinforcer 21 with a portion of the thin wall 23.

Figure 13:
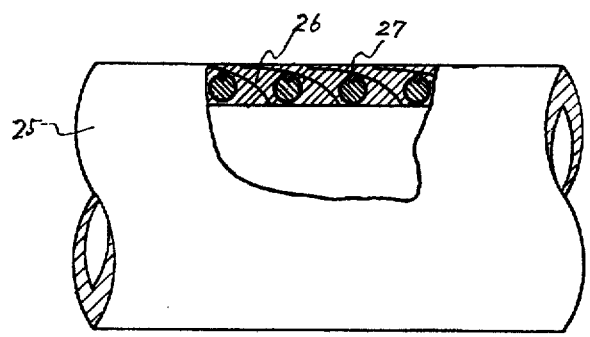
FIGS. 13–15 illustrate a modified form of hose in which a metal wire is also included for reinforcement.
Figure 14:
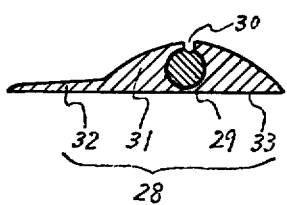
Figure 15:
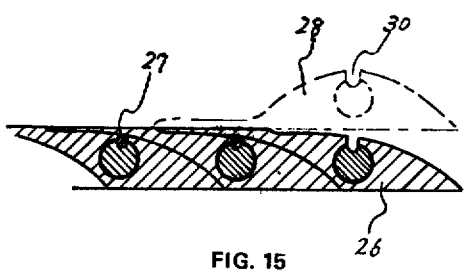

FIGS. 13–15 are an example of flexible hose containing copper wire, both the inner and outer surfaces of which are flat and wherein a slotted groove is provided in the outer surface of the reinforcer and a copper wire is wound along the slotted groove and in order to eliminate static electricity. This flexible hose 25 is constructed by winding spirally both the element 26 which becomes transformed from the composite strip 28 having the reinforcer 29 provided with a slotted groove 30 on the outer surface thereof and having the thin wall 32 and the base 33 and the copper wire 27 as shown in FIG. 14. The composite strip 28 is composed of the reinforcer 29 and the body 31. FIG. 15 shows that one side portion of the base of the composite strip forms the inner surface of the flexible hose 25, the residual portion thereof, longer than the portion forming the inner surface of the flexible hose 25, is wound on the preceding composite strip 28 while overlapping it thereon so that the composite strip 28 is transformed into the element 26 by covering the reinforcer 29 and the copper wire 27 with a portion of the following the thin wall 32.

Next, a flexible hose containing metal wire produced with the third flexible hose manufacturing process according to the present invention will be explained.

A flexible hose wherein ground wire for eliminating static electricity, or one or two metal wires used as operating wires to drive an electric cleaner or the like are embedded spirally in the tube wall made of relatively soft synthetic resin material along with spiral reinforcer made of synthetic resin material having relatively high physical strength, and further a flexible hose, in the spiral reinforcer of which are embedded one or two metal wires, are well known. But these well known flexible hoses, when envisaged from the stand point of the flexible hose maker, all necessitate special devices and make manufacturing processes thereof complicated and expensive. And when the flexible hose, having the metal wire embedded in the wall of relatively soft synthetic resin, is bent repeatedly, the tube wall will be cut soon by the metal wire and thereby breakage of the hose is caused, and if the flexible hose has the metal wire embedded in the spiral reinforcer the end of the ground wire cannot be taken out easily if there is a defect in the wire.

In the flexible hose of the present invention a spiral reinforcer made of synthetic resin having relatively high physical strength is embedded in the body wall made of relatively soft synthetic resin, and is characterized in that the spiral reinforcer is provided with one or more slotted grooves on the outer surface thereof, and in these slotted grooves is embedded an electric wire respectively.

Figure 16:
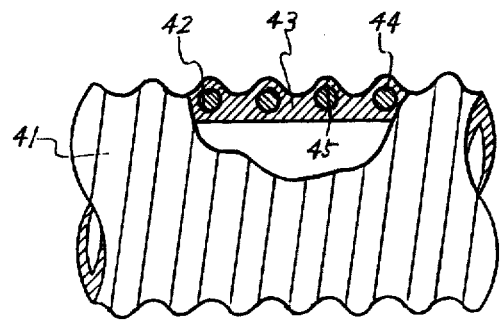
FIGS. 16–21 illustrate various other modifications of hose having one, or more, metal reinforcing wires embedded therein.
Figure 17:
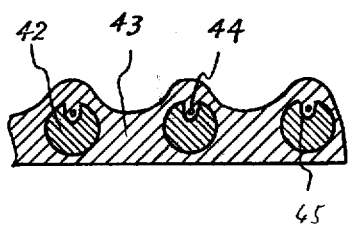
Figure 18:
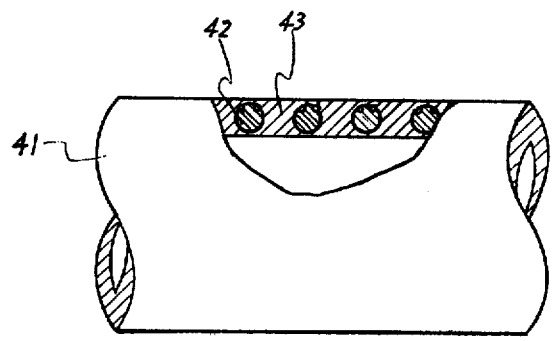
Figure 19:
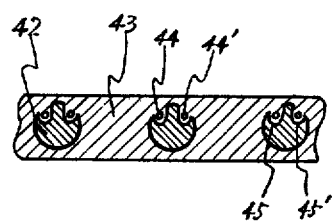
Figure 20:
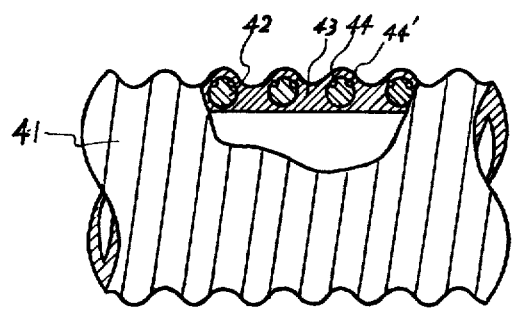
Figure 21:
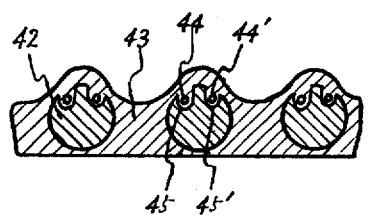

Hereinafter, the construction of the flexible hose according to the present invention will be explained referring to the drawing. A flexible hose embedded with a metal wire according to the present invention, in which both the inner and outer surfaces of which are flat is shown in FIG. 13. FIG. 16 and FIG. 17 show a hose embedded with a metal wire, the inner surface of the hose being flat and which has a projected portion continued spirally on the outer surface thereof, FIG. 18 and FIG. 19 show a hose embedded with two metal wires, the inner surface of which is flat and the outer surface of which is also flat, and FIG. 20 and 21 show a hose the inner surface of which is flat and which has a projected portion continued spirally on the outer surface thereof. In the drawings, 41 shows the hose, 42 the reinforcer made of synthetic resin having relatively high physical strength and having a spiral form, 43 represents the tube wall of relatively soft synthetic resin, and 44, and 44' the metal wires. As shown enlargedly in FIG. 17, FIG. 19 and FIG. 21, on or two metal wires, 44 or 44 and 44' are loaded in one or two slotted grooves, 45 or 45 and 45' provided on the outer surface of the reinforcer 42. The metal wire may be in contact with the bottom of the slotted groove 45 or floated thereabove and surrounded in that position by the softer material.

In the flexible hose according to the present invention, one or both slotted grooves provided on the outer surface of the spiral reinforcer contains one metal wire respectively, so that two metal wires will never contact each other, and also, as the metal wire is embedded in the interior of the reinforcer, the tube wall made of relatively soft synthetic resin will not be cut by repeated bending and thus no breakage will be brought about. And also, with the flexible hose according to the present invention, as the embedded metal wire will not impede the flexibility thereof, but also is coated with only soft synthetic resin, the end thereof can be taken out easily. Further, as the metal wire may be positioned out of contact with the bottom of the slotted groove, it is a great advantage that, when the diameter of the tube is required to be enlarged by heating for attaching a pipe joint, the flexible hose can be constructed so that enlargement of the diameter of the tube is accomplished easily and also without damaging the metal wire. Moreover, as above mentioned, with the flexible hose according to the present invention, as the metal wire is not subjected to any overload, it is, of course, a feature that as the inner surface of the hose may be made flat, the flow resistance in the interior of the tube may be also made small and a normal fine metal wire may be used so that the hose may be manufactured without necessity of special devices, so that it can be produced inexpensively.

And with respect to the whole of the present invention, the composite extruded strip relates to only its form, but not to the kind or composition of the synthetic plastic materials at all. Subsequently, the word, synthetic resin, indicated in this specification, includes thermoplastic or thermosetting synthetic resin or mixture thereof and also rubber material or mixture of rubber material and synthetic resin material.

EXAMPLE

Two sets of extruders having 65 mm diameter screws were used, and into one of them was supplied rigid polyvinylchloride resin compound of the formulation indicated in the following table, the extruder was sustained at a temperature of 135°–180°C and the melted resin compound was fed into the die.

And, into another extruder was supplied flexible polyvinylchloride resin compound of the formulation indicated in the following table, the temperature of the extruder being sustained at 110°–145°C and the melted resin compound was fed into the die. When the die was sustained at 150°–210°C and around the core of the rigid polyvinylchloride resin compound of 4 mm in diameter was encircled with flexible polyvinylchloride resin compound, a composite strip of the form as shown in FIG. 14 provided with a slotted groove of 0.7 mm in diameter from the apex thereof was extruded with a speed of 30 m/sec. This was wound on the rotary shaft of the tube forming machine after rotation thereof, a copper wire of 0.5 mm in diameter was loaded in the slotted groove. After finishing the winding of the composite strip, cooling with water was carried out and thereby a flexible hose containing copper wire of the shape shown in FIG. 13 of 50.8 mm in inner diameter and 60.8 mm in outer diameter was obtained. The spiral reinforcer was of 4mm in diameter.

| | Formulation of rigid polyvinylchloride resin | Formulation of flexible polyvinylchloride resin |
| --- | --- | --- |
| PVC (Average degree of polymerization 1100 | 100 parts | 100 parts |
| Tribasic lead sulfate | 2.5 parts | |
| Dibasic lead stearate | 0.5 parts | |
| Cadmium stearate | 0.5 parts | 0.5 parts |
| Barium stearate | 0.5 parts | 0.3 parts |
| Lead stearate | 0.3 parts | |
| Stearic acid | 0.3 parts | |
| Di-2-ethyl hexyl phthalate | | 80 parts |
| Organo cadmium-barium complex liquid stabilizer | | 1.8 parts |
| Pigment | a little | |
| Total | 104.6 parts | 182.6 parts |

For the sake of contrast, a flexible hose embedded with a reinforcer of rigid polyvinylchloride resin compound and copper wire alternately in the tube wall of flexible polyvinylchloride resin compound was manufactured, and compared with the flexible hose of the same size containing copper wire according to the present invention in a bending test. In the bending test, each flexible hose was cut into a section 51 cm in length and one end thereof was fixed, the other end being in the direction of the hose length through 21.5 cm at a speed of 25 strokes/min. As compared with the conventional flexible hose, which was broken at 2,000–3,000 strokes, the flexible hose according to the present invention was not broken until at about 30,000 strokes, and it was found that it has a bending performance of the same grade with a flexible hose not embedded with copper wire.

We claim:

1. Method of making spirally reinforced flexible tubular hose utilizing forming machines of the type wherein an annular array of rolls defines a winding mandrel, the improvement comprising the steps of extruding a composite strip of synthetic plastic materials while in a plastic condition comprising an exterior body of soft resilient synthetic plastic material and an embedded reinforcing body of synthetic plastic material having a composition different from that of the exterior body, the transverse cross-section of the extruded strip being defined by a flat base surface having a thickened apex portion disposed medially of the extremities of the flat surface, the apex portion having outwardly downwardly sloping opposing surfaces which meet with the respective extremities of said flat surface spirally winding said extruded strip on said mandrel with each successive turn overlapping a previous turn to fusion bond a substantial area of the flat surface of each turn to the thickened apex portion of a previous turn and also deforming the cross-section of the strip to an extent that the unbonded flat surfaces define a continuously smooth interior surface of the completed hose.

2. The method of claim 1, which includes the steps of initially forming the composite strip with a predetermined cross-section, transforming the configuration of said cross-section during said manipulation while the synthetic plastic material is in a plastic condition, and curing said synthetic plastic materials in said transformed and bonded condition.

3. The method of claim 2, wherein the initial configuration of the composite strip includes at least one generally straight side, said one side being transformed during said manipulation.

4. The method of claim 3, wherein the initial configuration of the composite strip is generally triangular and is transformed into the general outline of a parallelopiped during said manipulation.

5. The method of claim 3, wherein the initial configuration of the composite strip is defined by an enlarged area having a narrow-walled extension projecting to one side thereof.

6. The method of claim 5, wherein a portion of the surface of said reinforcing body of synthetic plastic material is exposed during said initial extrusion, and said projecting narrow-walled portion is manipulated to cover the exposed reinforcing body of the preceding turn of composite strip.

7. The method of claim 6, which includes the steps of forming a groove in said initially extruded reinforcing body, and inserting a metal wire in said groove during said manipulation.

8. The method of claim 5, wherein the initial configuration of the composite strip is defined by an area generally resembling an equilateral triangle having an arcuate apex, said reinforcing body being disposed approximately midway between the ends of the base.

9. The method of claim 5, wherein the initial configuration of the composite strip is defined by an area generally resembling a triangle having an arcuate apex and a narrow-walled projection from one side of the base thereof, said reinforcing body being fully embedded in said apex area.

10. The method of claim 9, which includes the steps of manipulating said composite strip to cover a portion of one of the triangular sides of each turn with the base surface of the narrow-walled projection of the succeeding turn.

11. The method of claim 9, which includes the steps of embedding a metal wire in said reinforcing body.

12. The method of claim 11, which includes the steps of forming a groove in said reinforcing strip having a larger cross-section than that of said embedded wire, and filling the additional space in the groove with the synthetic plastic material of the exterior body.

13. The method of claim 11, which includes the steps of manipulating said composite strip to cover one of the triangular sides and the arcuate apex of each turn with the base surface of the narrow-walled projection of the succeeding turn.

* * * * *

UNITED STATES PATENT OFFICE
CERTIFICATE OF CORRECTION

PATENT NO. : 3,919,026
DATED : November 11, 1975
INVENTOR(S) : Tadashi Mizutani and Soshiro Ono It is certified that error appears in the above-identified patent and that said Letters Patent are hereby corrected as shown below:

On the cover page, please insert the following:

--Foreign Application Priority Data

Japan      October 27, 1970.......94953/70--

Signed and Sealed this

*first* Day of *June 1976*

[SEAL]

Attest:

RUTH C. MASON
*Attesting Officer*

C. MARSHALL DANN
*Commissioner of Patents and Trademarks*